Jan. 26, 1937.  C. E. HANNY  2,068,981
AUTOMATIC FOUNTAIN WATERER
Filed Oct. 14, 1933   2 Sheets-Sheet 1
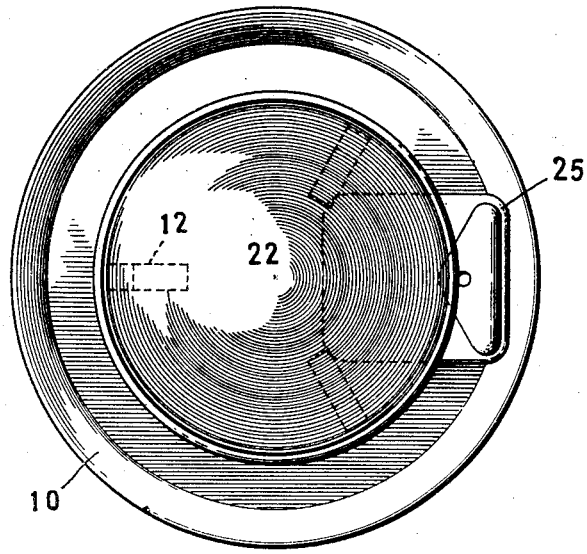
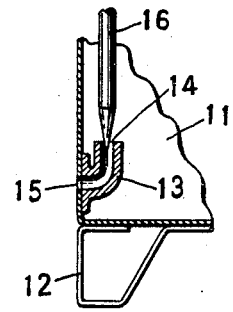
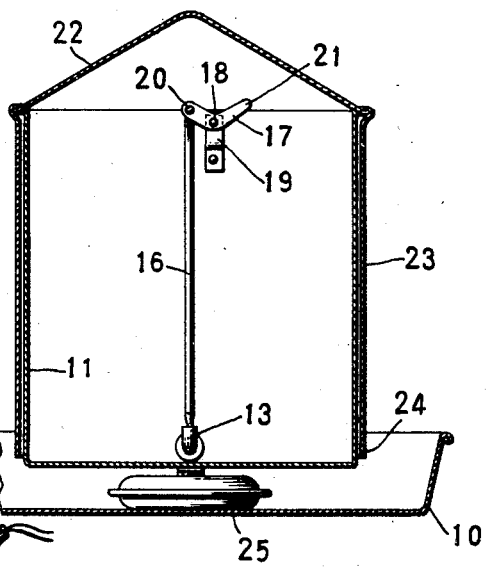
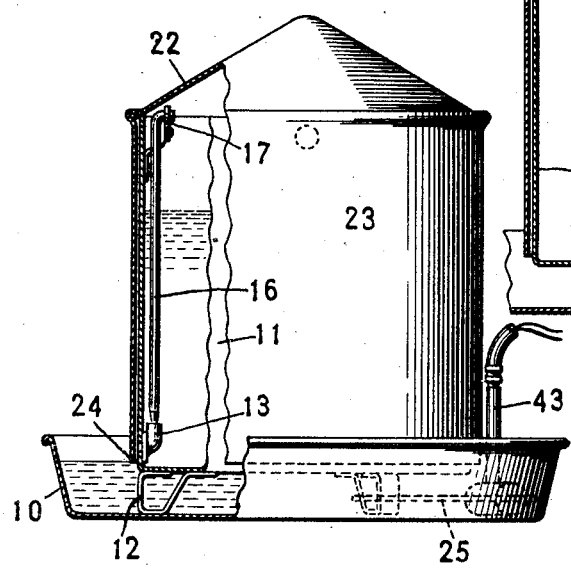
INVENTOR
CHARLES E. HANNY,
BY
ATTORNEY Jan. 26, 1937.　　　C. E. HANNY　　　2,068,981
AUTOMATIC FOUNTAIN WATERER
Filed Oct. 14, 1933　　　2 Sheets-Sheet 2
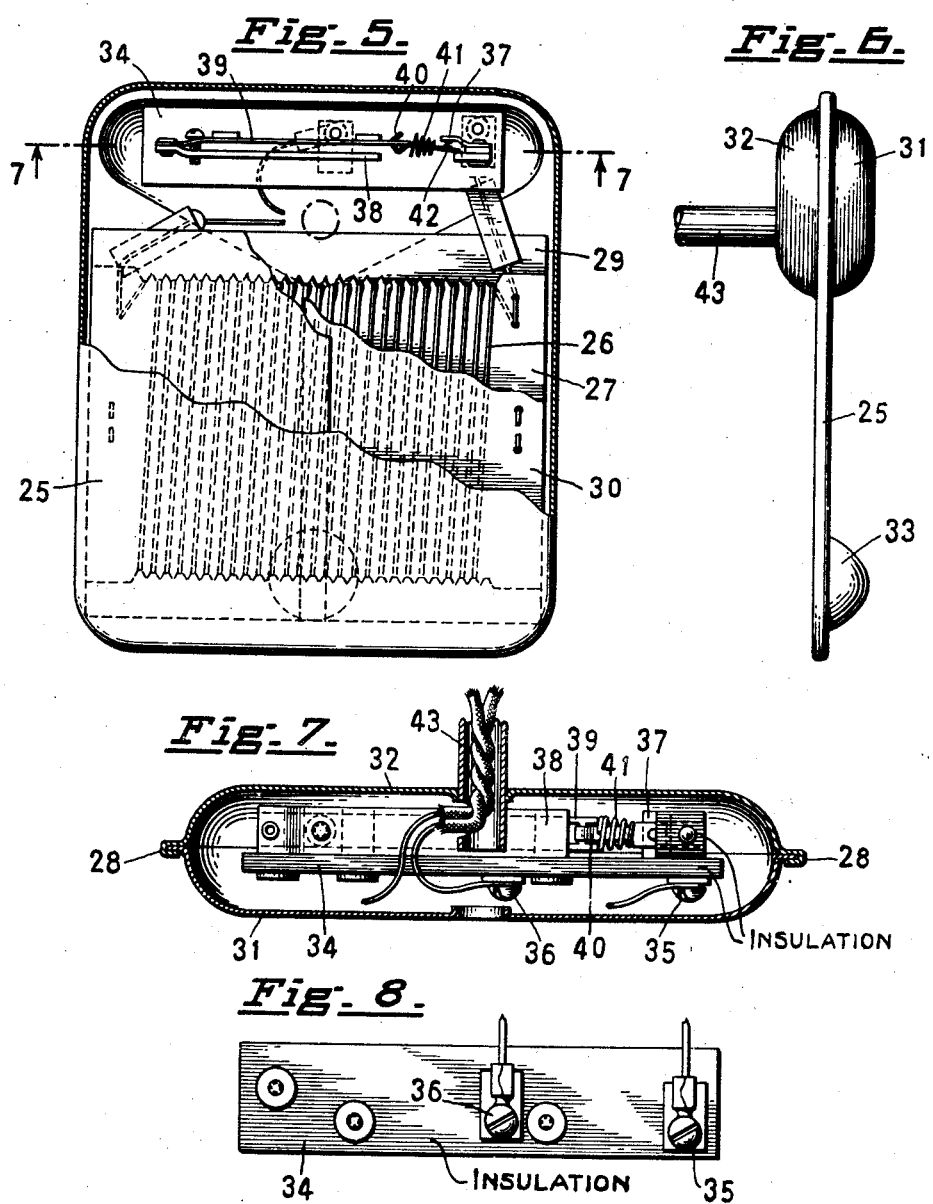
INVENTOR
CHARLES E. HANNY,
BY
ATTORNEY Patented Jan. 26, 1937

2,068,981

UNITED STATES PATENT OFFICE 2,068,981

AUTOMATIC FOUNTAIN WATERER

Charles E. Hanny, Plainville, Conn., assignor to The Trumbull Electric Manufacturing Company, Plainville, Conn., a corporation of Connecticut Application October 14, 1933, Serial No. 693,536

3 Claims. (Cl. 119—73)

My invention relates to sanitary drinking fountains intended primarily for poultry or for small animals.

One object is to provide a drinking fountain having a supply tank seated in a drinking pan and an electrically operated automatic heater unit in the drinking pan, the supply tank, the drinking pan and the heater unit being so positioned with respect to each other that the heated water in the drinking pan and the heater unit will co-operate to warm the water in the supply tank to prevent freezing of the same in the event of excessively low temperature.

Another object is to provide a construction of this character in which the supply tank may be readily filled and in which the parts may be readily disassembled for the cleaning of the supply tank, the drinking pan, the heater unit and other correlated parts.

Fig. 1 is a plan view of a construction embodying my invention.

Fig. 2 is a side view and partial section showing the valve controlled outlet.

Fig. 3 is a vertical sectional view of the apparatus taken at right angles to the view of Fig. 2 and showing a heater in the pan.

Fig. 4 is a fragmentary enlarged section of the lower left hand end of the tank of Fig. 2 showing the valved outlet.

Fig. 5 is a plan view and partial section of the electric heating device.

Fig. 6 is a side view of the same.

Fig. 7 is a vertical sectional view on the plane of the line 7—7 of Fig. 5.

Fig. 8 is a bottom plan view of the thermostatic device.

The pan 10 may be of any suitable construction and size. The auxiliary reservoir or tank 11 is adapted to be supported by a number of legs 12 in the pan. The tank is provided with an outlet member 13 having an inlet 14 at the upper end and an outlet 15 at its lower end. A rod 16 has its lower end shaped to fit the inlet 14 so that when the rod is permitted to fall by gravity it will close the passage through the outlet member. A lever 17 is hinged at 18 to a bracket 19 which projects from the inside upper edge of the tank. One end of this lever is hinged at 20 to the valve rod and the other end 21 projects into a position to be engaged by a portion of the cover member 22 when the cover is in position. This cover member has a sleeve portion 23 which may be integral with the cover or may be secured to it in any suitable manner. This sleeve portion loosely surrounds the tank and has its lower edge 24 long enough to extend into the water in the pan below the outlet 15. When the cover is in position the valve rod 16 is raised and a limited amount of water is allowed to flow from the tank into the pan. Atmospheric pressure maintains the water level in the pan substantially constant.

For controlling the minimum temperature of the water in the drinking pan I provide an electric heating device 25. This heating device includes a resistance wire 26 wound on an insulating support 27 and enclosed in a casing formed of two parts having their edges 28 clamped together or otherwise connected so as to hermetically seal all of the electrical parts inside.

The two parts of the casing closely embrace the heater coil but are electrically insulated from the coil by sheets of mica 29 and 30, or other suitable insulating material. The two parts of the casing are provided with projections 31 and 32, respectively, which form between them an air chamber for enclosing the thermostatic switch. The lower part of the casing is also provided with a boss 33 which with the boss 31 forms feet for supporting the heater in the pan and for forming an open space between the heater unit and the pan.

The thermostatic switch may be of any suitable construction, preferably such as shown in Patent No. 1,928,484 dated September 26, 1933.

This thermostatic switch is preferably constructed as a unit adapted to be housed in the pocket or chamber in the heater casing and has an insulating base 34 with circuit terminals 35 and 36. The terminal 35 is connected to the stationary switch contact 37. The terminal 36 is connected to the bar 38 which carries the thermostatic arm 39. The toggle member 40 which is under pressure of the spring 41 carries the movable switch contact 42. The thermostatic arm and switch contacts are so designed as to normally maintain the circuit in an open or off condition but are arranged so that when the temperature decreases to a predetermined degree the thermostatic arm will bend or warp with a snap action and close the circuit. When the circuit is closed the heater element will function and will continue its heating effect until the temperature of the water in the drinking pan has been increased to a predetermined high degree at which time the thermostatic switch will snap to the "off" position and thus cut out the heater circuit. The conductors leading to the heater are protected by a tube 43 which is secured to the casing and forms a handle for convenience in inserting and removing the heater from its position in the water pan.

This heater being positioned within the water pan and below its edge is, of course, entirely immersed in and surrounded by the water and thus evenly heats and prevents the water from becoming cooler than the predetermined degree. While it is not necessary to maintain the entire body of water at the temperature of the drinking surface, it is most desirable to prevent any part of the water in the tank or pan from freezing and the construction shown and described has this advantage. Even, however, if in extremely low temperatures the top of the water in the tank should freeze, the lower part of the ice would still be in contact with the heated water and directly in line with the heat conducted from the heater unit and freezing of the entire supply of water in the pan or trough would thus be prevented. Naturally the heater would be adjusted so that under any normal conditions the full tank would not freeze.

This construction and arrangement maintains a suitable or drinkable temperature of the drinking water unitil it is substantially exhausted. The heater being flat and thin maintains its heater function until the water in the pan is practically gone.

The form of heater shown herein is of especially effective design because of its extended flat form which affords a maximum heating area in the closest possible relation to the water so that the thermal losses will be minimized. The bulbous enlargement in the heater casing furnishes air space for the thermostatic switch. The outer walls of this air space are, of course, subjected to the cooling effect of the water but, because of the air space, thermostatic action does not operate the switch to shut off the current until the water has become sufficiently warm.

A particular advantage of the heater unit is that the portion of it which encloses the resistance or heater element is adapted to be immersed in approximately the central portion of the body of water in the drinking pan and thus maintains the entire body of water in the pan at substantially the same temperature.

The exact shape of the heater unit is not vital to the invention but the very thin or pan-cake like character is important as it conducts heat directly to the water with a maximum of speed and efficiency.

I claim:

1. A watering device including a lower pan, a tank closed at the bottom and supported in the pan above the bottom thereof with a shallow water space between the bottom of the pan and the bottom of the tank, said tank having an outlet member for feeding water to the pan so that the water therein is normally in contact with the tank bottom, and a thermostatically controlled electric heating device and switch unit located in the pan in the water space beneath the tank.

2. A watering device including a lower pan, a tank closed at the bottom and demountably supported within said pan in spaced relation thereto so that a shallow water space exists between the bottom of the pan and the bottom of the tank, said tank having an outlet member for feeding water to said pan so that the water therein is normally in contact with the tank bottom, and an electric heating element removably located in the pan in the water space beneath the tank.

3. A watering device including a lower pan, a tank closed at the bottom and demountably supported within said pan in spaced relation thereto so that a shallow water space exists between the bottom of the pan and the bottom of the tank, said tank having an outlet member for feeding water to said pan so that the water therein is normally in contact with the tank bottom, and an electric heating element removably located in the pan in the water space beneath the tank and spaced from both the pan bottom and the tank bottom.

CHARLES E. HANNY.